(12) United States Patent
Javli et al.

(10) Patent No.: US 7,729,958 B2
(45) Date of Patent: Jun. 1, 2010

(54) METHOD AND SYSTEM FOR DETERMINING ABSORPTION COSTS FOR TRANSFERS BETWEEN A PLURALITY OF COST GROUPS

(75) Inventors: Veeresha Javli, San Mateo, CA (US); Lina C. Velasquez, San Carlos, CA (US); Valter Pilan, San Paulo/SP (BR); Mario Nobre, Cotia-SP (BR)

(73) Assignee: Oracle International Corporation, Redwood Shores, CA (US)

( * ) Notice: Subject to any disclaimer, the term of this patent is extended or adjusted under 35 U.S.C. 154(b) by 1358 days.

(21) Appl. No.: 11/019,346

(22) Filed: Dec. 21, 2004

(65) Prior Publication Data

US 2006/0059022 A1    Mar. 16, 2006

Related U.S. Application Data

(60) Provisional application No. 60/608,677, filed on Sep. 10, 2004.

(51) Int. Cl.
*G06Q 10/00* (2006.01)
*G06Q 40/00* (2006.01)

(52) U.S. Cl. .................. 705/28; 705/37; 705/330; 705/338

(58) Field of Classification Search ............... 705/28, 705/37; 707/104
See application file for complete search history.

(56) References Cited

U.S. PATENT DOCUMENTS

| | | | |
|---|---|---|---|
| 6,260,047 B1 * | 7/2001 | Fox et al. | 707/104.1 |
| 2002/0107782 A1 * | 8/2002 | Greenberg et al. | 705/37 |
| 2003/0061126 A1 * | 3/2003 | Erke et al. | 705/28 |

* cited by examiner

*Primary Examiner*—F. Ryan Zeender
*Assistant Examiner*—Denisse Ortiz Roman
(74) *Attorney, Agent, or Firm*—Townsend and Townsend and Crew, LLP

(57) ABSTRACT

Embodiments of the present invention are directed to a method for determining absorption costs for transfers between a plurality of cost groups. In one embodiment, a transferable item is identified. A plurality of cost group sets among which the transferable item is transferred is then defined. Then, a processing sequence of the plurality of cost group sets is determined. An iterative process for determining the cost of transfers between the plurality of cost groups is performed based upon the processing sequence.

21 Claims, 12 Drawing Sheets

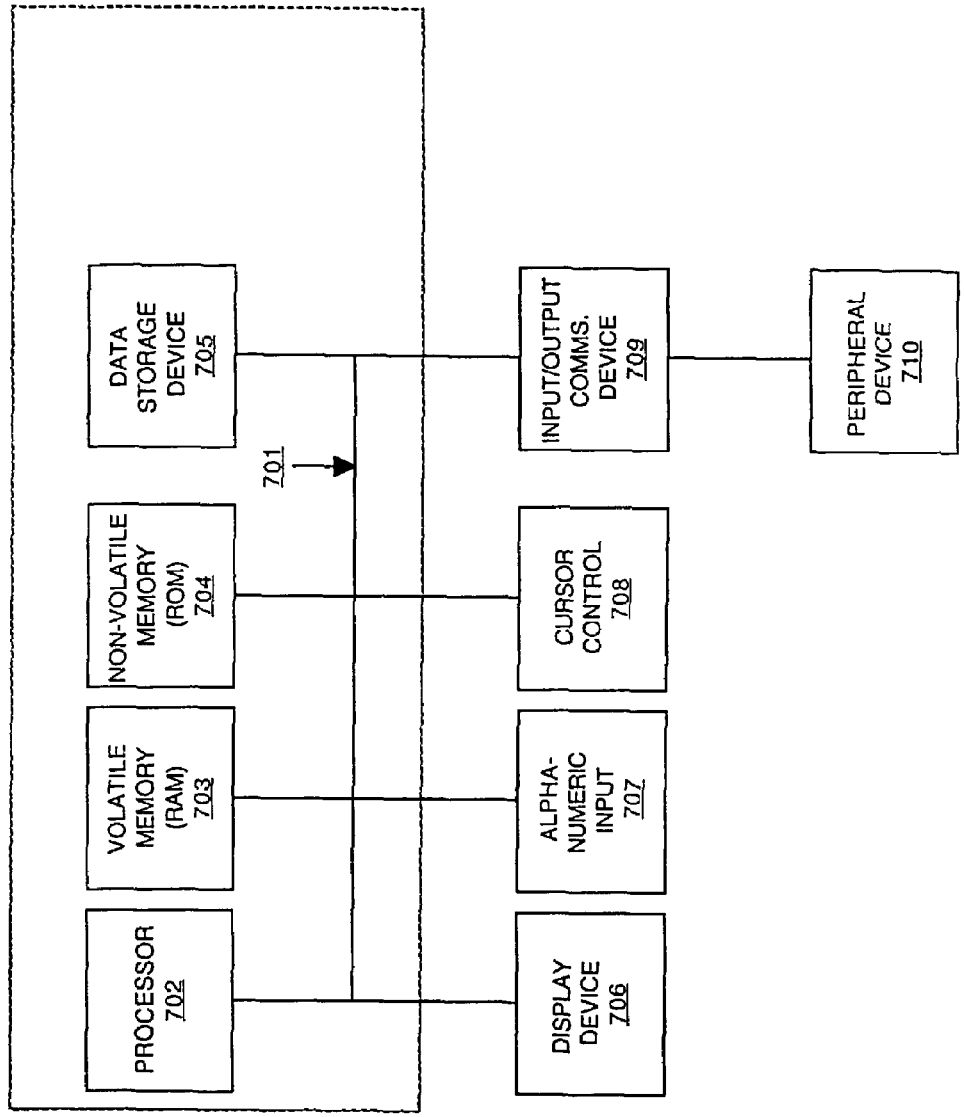

METHOD AND SYSTEM FOR DETERMINING ABSORPTION COSTS FOR TRANSFERS BETWEEN A PLURALITY OF COST GROUPS

RELATED APPLICATIONS

The present application claims priority from U.S. provisional patent application No. 60/608,677 filed Sep. 10, 2004 entitled "Absorption Cost Algorithm," by V. Javli, L. Velasquez, V. Pilan, and M. Nobre, assigned to the assignee of the present invention, and which is hereby incorporated by reference in its entirety herein.

FIELD OF THE INVENTION

Embodiments of the present invention are related to the field of methods for determining the cost of a transfer between cost groups.

BACKGROUND OF THE INVENTION

The appropriate valuation and analysis of manufacturing costs have been for years a key factor in a successful business management. Manufacturing costs are commonly calculated on the basis of average cost, standard cost, periodic cost, last-in-first-out (LIFO) cost, or first-in-first-out (FIFO) cost. These costing methods are implemented on computer systems. Companies choose the costing method that is best suited for their business requirements, or that is required by law. It is not unusual to find companies using one method for fiscal or legal purposes and another for internal management analysis.

Transfers of goods (e.g., raw materials and/or manufactured sub-assemblies) across organizations are common in the business world. The cost of the goods being transferred, as well as freight and/or special charges involved in the transfer process, often impacts the average cost of the item. This is particularly true when inventory valuation is determined by the absorption costing method. In absorption costing, variable costs and some of the fixed costs are assigned to each item in the inventory.

Some scenarios for transferring materials can be defined very simply, thus simplifying the calculation of absorption costs. For example, FIG. 1A shows a simple transfer of an item between two cost groups. In FIG. 1A, cost group 1 (e.g., 101) ships an item to cost group 2 (e.g., 102). In the scenario of FIG. 1A, cost group 1 bills cost group 2 for the unit cost already known for the item being transferred. The price for this item to cost group 2 includes the price of the item charged by cost group 1, as well as any freight or other special charges associated with the transfer of the item.

Other scenarios are more complex depending on the volume of the organizations and the relationships between them, thus complicating the calculation of absorption costs. For example, inter-organization transfer of goods between cost groups (e.g., warehouses, manufacturing plants, etc.) makes absorption costing difficult. In scenarios where transfers of the same item occur back and forth between two facilities make the process of costing the transfer even more difficult, since the correct sequence for processing transfers is not always obvious. Additionally, if the two cost groups are located in, for example, warehouses in two different locations, different costing methods may complicate accurately costing the transfer of goods.

As shown in FIG. 1B, there are transfers from cost group 1 to cost group 2 as well as transfers from cost group 2 to cost group 1. Thus, cost group 1 bills cost group 2 for the unit cost already known for the item being transferred. The price for this item to cost group 2 includes the price of the item charged by cost group 1, as well as any freight or other special charges associated with the transfer of the item. The receiving cost for cost group 2, as many other cost owned transactions, is considered for the calculation of the average cost of cost group 2. In return, cost group 2 bills cost group 1 for the unit cost already known for the item being transferred. The price for this item to cost group 1 includes the price of the item charged by cost group 2, as well as any freight or other special charges associated with the transfer of the item. Thus, the cost of receiving the item should be considered when calculating the average cost of the item for cost group 1.

In more complex scenarios, as shown in FIG. 1C, the proper sequence for processing the transfer of items is not readily apparent. In FIG. 1C, the costing of transferring the item is complicated by the multiple transfers as described above with reference to FIG. 1B, as well as the plurality of cost groups (e.g., cost groups 101 through 106) between which the item is transferred. For example, with reference to FIG. 1C, it may be difficult to determine which cost group should be first in the costing sequence and which should be last. Additionally, determining that the cost of the transfers between the cost groups is accurate is difficult. Finally, if the sequencing of the cost groups when determining absorption costs is not correct, one cost group may actually show a negative inventory.

SUMMARY OF THE INVENTION

Accordingly, need exists for a method and computer system for determining absorption costs which accounts for transfers of an item between cost groups. While meeting the above stated need, it is desirable that such a method determines a sequence for processing transfer costs to prevent negative inventory balances.

Embodiments of the present invention are directed to a method and system for determining absorption costs for transfers between a plurality of cost groups. In one embodiment, a transferable item is identified. A plurality of cost group sets among which the transferable item is transferred is then defined. Then, a processing sequence of the plurality of cost group sets is determined. An iterative process for determining the cost of transfers between the plurality of cost groups may be performed based upon the processing sequence.

In one embodiment of the present invention, a transferable item is identified and a plurality of cost groups which have transferred that item are identified. The cost groups are then arranged in three cost group sets and the costing of the transferable item is performed in sequence. The first cost group set in the sequence comprises cost groups which have generated transfer shipments. The second cost group set in the sequence comprises cost groups which have generated transfer shipments and transfer receipts. The third cost group set in the sequence comprises cost groups which have generated transfer receipts.

Within each of the cost group sets, the cost groups are sequenced in ascending order based upon the inventory balance of a particular item being transferred. Thus, the first cost group in a cost group set is the cost group having the lowest inventory balance of the transferable item. An iterative process is then performed to determine the cost of transfers between cost groups.

In one embodiment, the iterative process comprises processing the transfer receipts for the first cost group and calculating the periodic average cost of that transferable item based, in part, upon the cost of the transfer receipt. The periodic average cost is then used to determine the transfer shipping cost of the item to a second cost group. The periodic average cost of the item is calculated for the second cost group. The periodic average cost of the item is used to determine the transfer shipping cost of the item when it is shipped back to the first cost group.

At this point, the transfer shipping cost of the first cost group is compared with the transfer receipt cost of the second cost group. Additionally, the transfer shipping cost of the second cost group is compared with the transfer receipt cost of the first cost group. If the differences between these transfer costs is within a pre-defined parameter then the absorption cost of the transfer between these cost groups has been calculated. However, if the differences between these transfer costs is not within the pre-defined parameter, the iterative process is repeated using the new transfer cost from the second cost group to the first cost group when determining the periodic average cost of the item for the first cost group. The first cost group uses this new average cost as the transfer shipping cost which is billed to the second cost group. This iterative process may be continued until the differences between the shipping costs for both cost groups is within the pre-defined parameter.

Embodiments of the present invention are advantageous because they define the costing sequence of cost groups in a manner which avoids creating negative inventory balances while accurately determining the cost of multiple transfers between two cost groups.

Embodiments of the present invention include a computer system implemented in accordance with the above.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

FIG. 7 is a block diagram of an exemplary computer system upon which embodiments of the present invention may be implemented.

DETAILED DESCRIPTION OF THE PREFERRED EMBODIMENT

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signal capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "identifying," "defining," "determining," "performing," "processing," "comparing," "repeating," "creating," "establishing," "using," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1A:
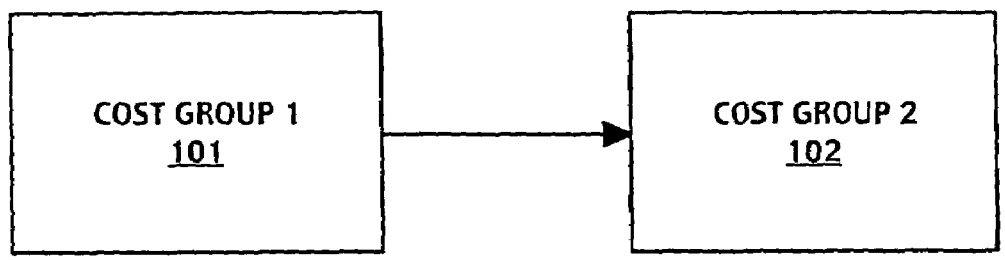
FIGS. 1A, 1B, and 1C show scenarios of transfers between cost groups in accordance with the prior art.
Figure 1B:
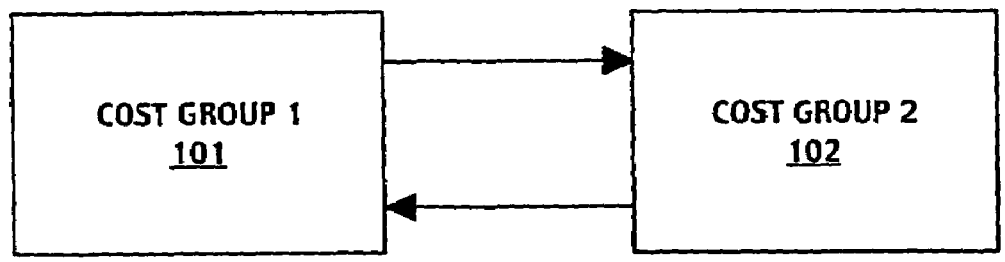
Figure 1C:
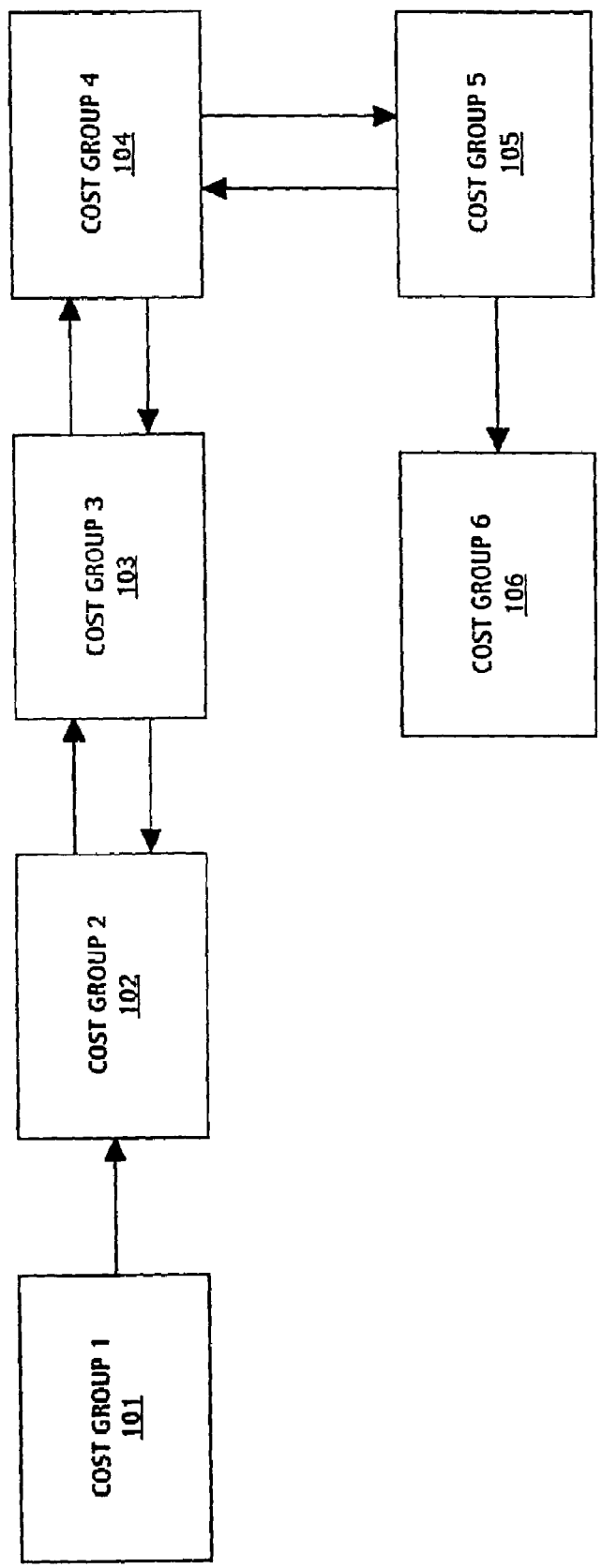
Figure 2:
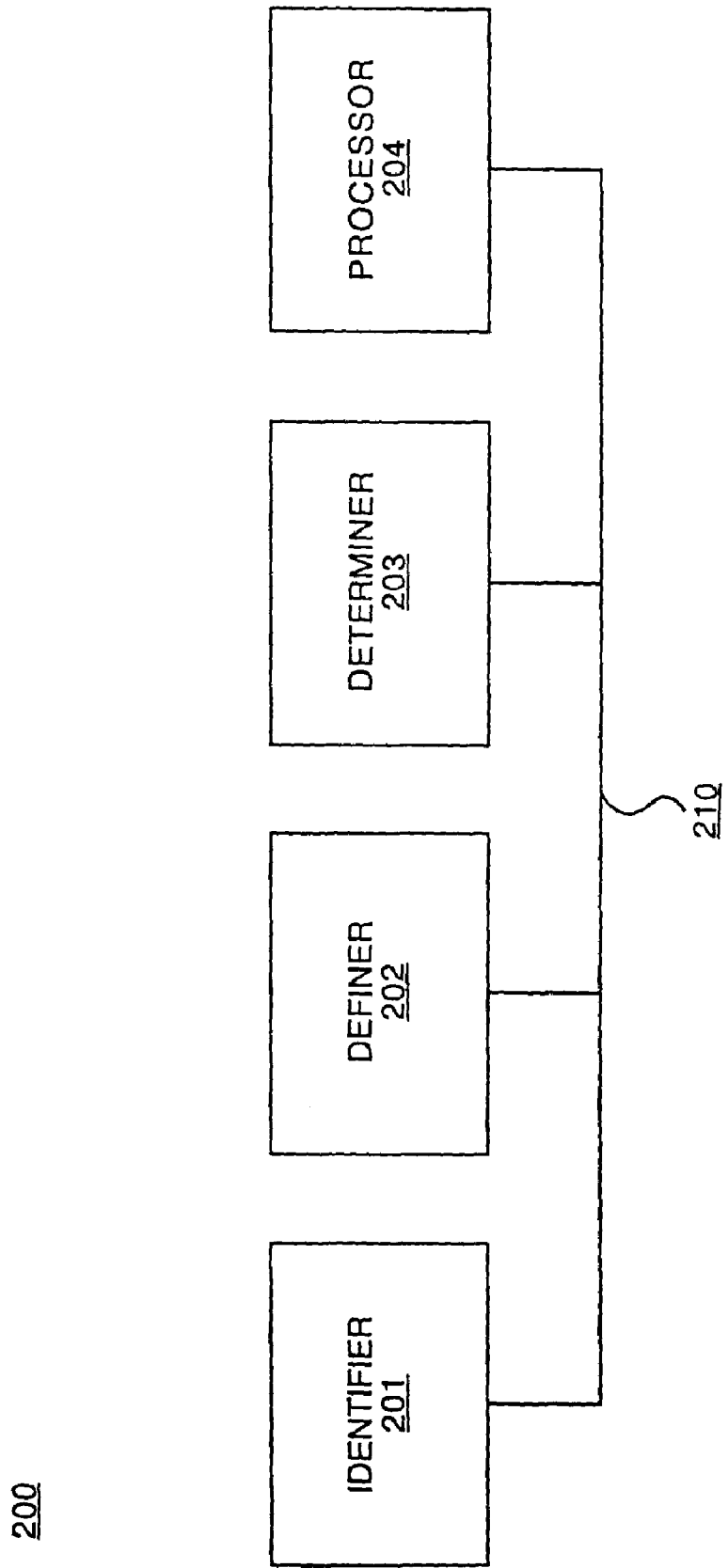
FIG. 2 is a block diagram of an exemplary system for determining absorption costs for transfers between a plurality of cost groups in accordance with the present invention.

FIG. 2 is a block diagram of an exemplary system 200 for determining absorption costs for transfers between a plurality of cost groups in accordance with the present invention. In FIG. 2, an identifier 201 is coupled with a bus (210 bus not in FIG. 2). In embodiments of the present invention, identifier 201 is for identifying a transferable item. System 200 further comprises a definer 202 coupled with bus (correct the bus number) for defining a plurality of cost group sets among which the transferable item is transferred. A determiner 203 for determining a processing sequence of the plurality of cost groups is also coupled with bus 210. Finally, a processor 204 coupled with bus 210 is for performing an iterative process for determining the cost of transfers between the plurality of cost groups based upon the processing sequence determined by determiner 203.

In embodiments of the present invention, system 200 may be implemented as a single device (e.g., computer system 700 of FIG. 7), or in a distributed manner (e.g., a computer network). In embodiments of the present invention, system 200 is for determining the absorption costs for transfers between a plurality of cost groups. It is appreciated that identifier 201, definer 202, determiner 203, and processor 204 may be implemented as components of computer readable program code for causing a computer system (e.g., system 700 of FIG. 7) to perform a method for determining absorption costs for transfers between a plurality of cost groups in accordance with embodiments of the present invention.

Figure 3:
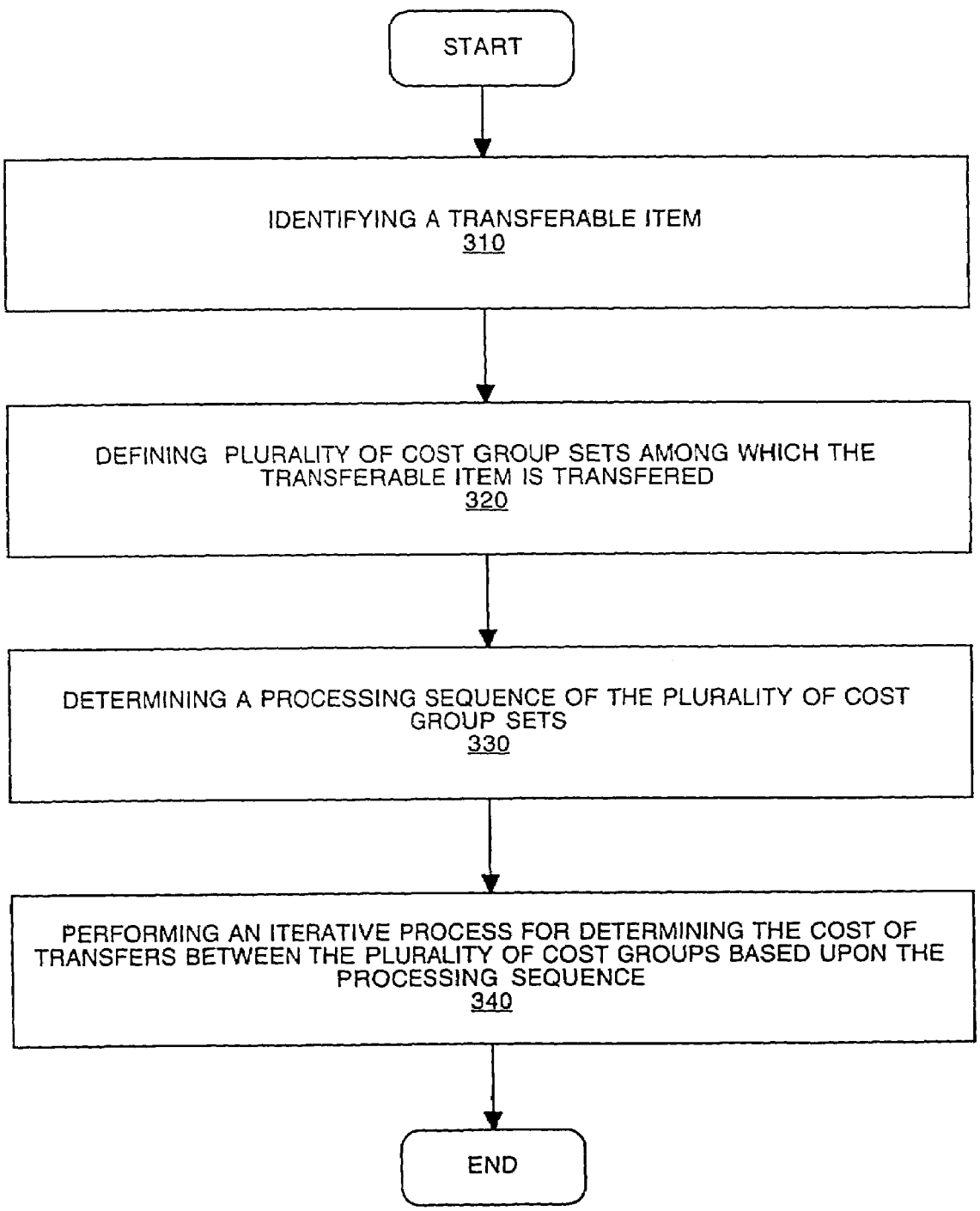
FIG. 3 is a flowchart of a method for determining absorption costs for transfers between a plurality of cost groups in accordance with embodiments of the present invention.

FIG. 3 is a flowchart of a computer implemented method 300 for determining absorption costs for transfers between a plurality of cost groups in accordance with embodiments of the present invention. In step 310 of FIG. 3, a transferable item is identified. In embodiments of the present invention, the iterative process of method 300 can determine the absorption costs of each transferable item transferred between cost groups. In embodiments of the present invention, the transferable item may be a raw material, a part, or an assembly of parts (e.g., a sub-assembly or a finished assembly). For the purposes of the present invention, a "cost group" may be defined as one or premises of a company (e.g., a manufacturing plant and/or warehouse) that is considered as a unit for costing purposes.

Figure 4:
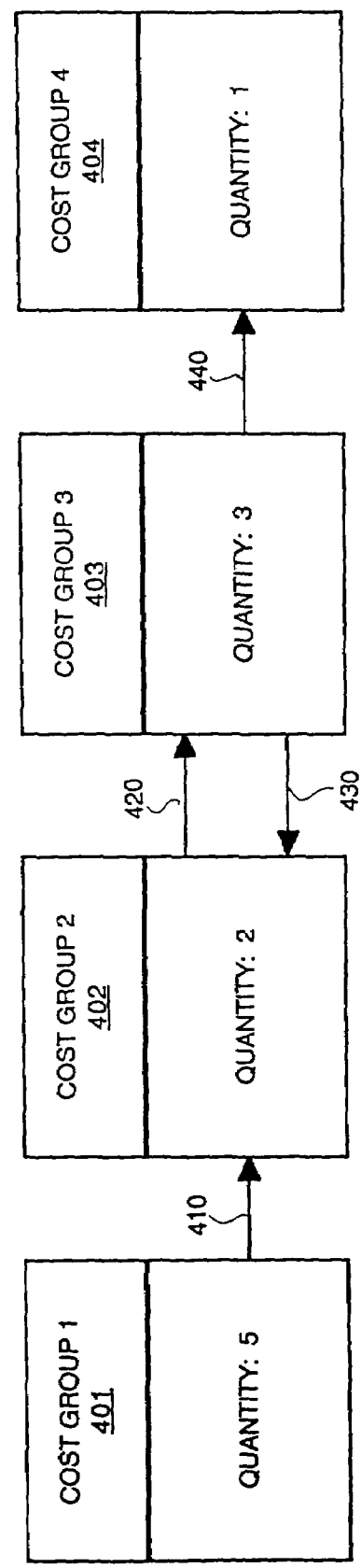
FIG. 4 is a block diagram showing how cost group sets are defined and sequenced in accordance with embodiments of the present invention.

In step 320 of FIG. 3, a plurality of cost group sets among which the transferable item is transferred are defined. In embodiments of the present invention, the cost groups among which the transferable item is transferred are organized into cost group sets. FIG. 4 is a block diagram showing how cost group sets are defined and sequenced in accordance with embodiments of the present invention. In FIG. 4 cost group 1 (e.g., 401) has an initial inventory of 5 transferable items (not shown) and has generated a transfer shipment (e.g., 410) of at least one of the transferable item to cost group 2 (e.g., 402). Cost group 2 has an initial inventory of 2 transferable items and has generated a transfer shipment (e.g., 420) of at least one of the transferable item to cost group 3 (e.g., 403). Cost group 3 has an initial inventory of 3 transferable items and generates a transfer shipment (e.g., 430) of at least one of the transferable item to cost group 2 and another transfer shipment (e.g., 440) of at least one of the transferable item of the transferable item to cost group 4 (e.g., 404).

In embodiments of the present invention, cost groups may be defined in three sets:

Cost group set 1 comprises cost groups which have generated transfer shipments.

Cost group set 2 comprises cost groups which have generated transfer shipments and transfer receipts.

Cost group set 3 comprises cost groups which have generated transfer receipts.

With reference to FIG. 4, using the above parameters for defining the cost group sets, the cost groups may be defined in the following cost group sets:

Cost group set 1: Cost group 1 (401).
Cost group set 2: Cost group 2 (402) and cost group 3 (403).
Cost group set 3: Cost group 4 (404).

In step 330 of FIG. 3, a processing sequence of the plurality of cost group sets is determined. In embodiments of the present invention, after the cost group sets are defined, they are organized in a processing sequence. This sequence determines the successive order in which the cost group sets, and their respective cost groups, will be processed for a specific transferable item when calculating the cost of the transfer transactions. In embodiments of the present invention, the processing sequence in which cost group sets are considered for cost calculation may be the same sequence shown above:

1) Cost groups which have generated transfer shipments.
2) Cost groups which have generated transfer shipments and transfer receipts.
3) Cost groups which have generated transfer receipts.

Furthermore, in embodiments of the present invention, a processing sequence for the cost groups comprising each of the cost group sets is also defined. In embodiments of the present invention, the cost groups are ranked in ascending order based upon the inventory of the transferable item. Referring again to FIG. 4, cost group set 1 and cost group set 4 comprise only one cost group. Therefore, sequencing these cost group sets is not necessary. However, cost group set 2 comprises cost group 2, having an inventory of 2 transferable items, and cost group 3, having an inventory of 3 transferable items at the time just before processing the inter-organization transactions. Note that the inventory is the balance after processing all the cost owned transactions in each cost group in that PAC period, just before processing the inter-organization transactions As a result, cost group 2 will be processed before cost group 3 because it has a lower inventory of the transferable item. Accordingly, the exemplary sequence for processing the cost groups of FIG. 4 is:

1) Cost group 1 (401).
2) Cost group 2 (402).
3) Cost group 3 (403).
4) Cost group 4 (404).

In step 340 of FIG. 3, an iterative process is performed for determining the cost of transfers between the plurality of costs groups based upon the processing sequence. In other words, the iterative process is first performed to calculate the cost of transfer transactions for cost group 1 (401), followed by calculating the cost of transfer transactions for cost group 2 (402), cost group 3 (403), and cost group 4 (404) successively.

In embodiments of the present invention, the iterative process is repeated until a tolerance is achieved for all transactions considered in the process. For the purposes of the present invention the term "tolerance" refers to a permitted variation between the shipping transaction cost of a transfer and the corresponding receiving transaction cost of the transfer. In embodiments of the present invention, the tolerance may be a user determined parameter and costing of the shipment is generally not considered resolved until the absolute value of the difference between the shipping transaction cost and the corresponding receiving transaction cost is less than or equal to the value indicated as a tolerance.

Although the method of the present invention may be implemented using a variety of programming languages, the following pseudo-code is an exemplary implementation the iterative process used in accordance with embodiments of the present invention to determine the absorption costs for transfers between a plurality of cost groups.

Identify items with transfers across cost groups.
For each item transferred across cost groups;
LOOP
Identify the cost groups which have transferred the item;

```
    Determine the optimal sequence in which cost groups should be
processed;
    END LOOP
Perform iteration process;
    For each item;
    LOOP
    For each iteration;
        LOOP
    For each cost group according to the optimal sequence;
            LOOP
            If the iteration it the first iteration:
                a) Process receipts as cost owned transactions
                respecting Freight-On-Board points;
                b) Calculate the Periodic-Moving-Average-Cost
                (PMAC) of the item;
                c) Process shipments as cost derived transactions;
                d) Assign the PMAC cost of the item to shipments,
                which is the item cost of the shipping cost group for
                the iteration
            End of first iteration.
            Determine the difference between cost of shipments in
        current iteration and cost of corresponding receipts in the same
        iteration from the other cost groups;
        If the tolerance is achieved for all the receipts in all the cost groups;
            END COST GROUP LOOP;
        END ITERATION LOOP;
        If the tolerance is not achieved for all the receipts in all the cost
    groups;
            Perform consecutive iteration;
                a) Process receipts as cost owned transactions
                respecting Freight-On-Board points;
                b) Re-calculate the PMAC of the item based on the
                corresponding shipment's item cost of the sending
                cost group which was derived in the previous iteration;
                c) Process shipments as cost derived transactions;
                d) Assign the re-calculated PMAC cost of the item to
                shipments, which is the item cost of the shipping cost
                group for the iteration;
            End of consecutive iteration;
            END COST GROUP LOOP
        END ITERATION LOOP;
    END ITEM LOOP.
```

Figure 5:
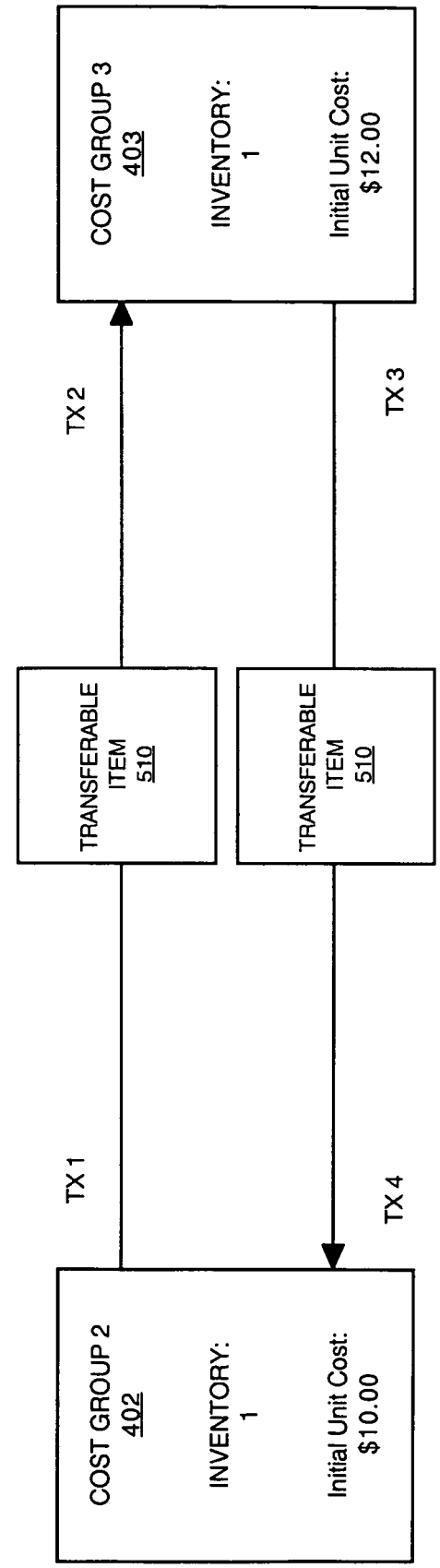
FIG. 5 shows a plurality of cost groups transferring an item in accordance with embodiments of the present invention.
Figure 6A:
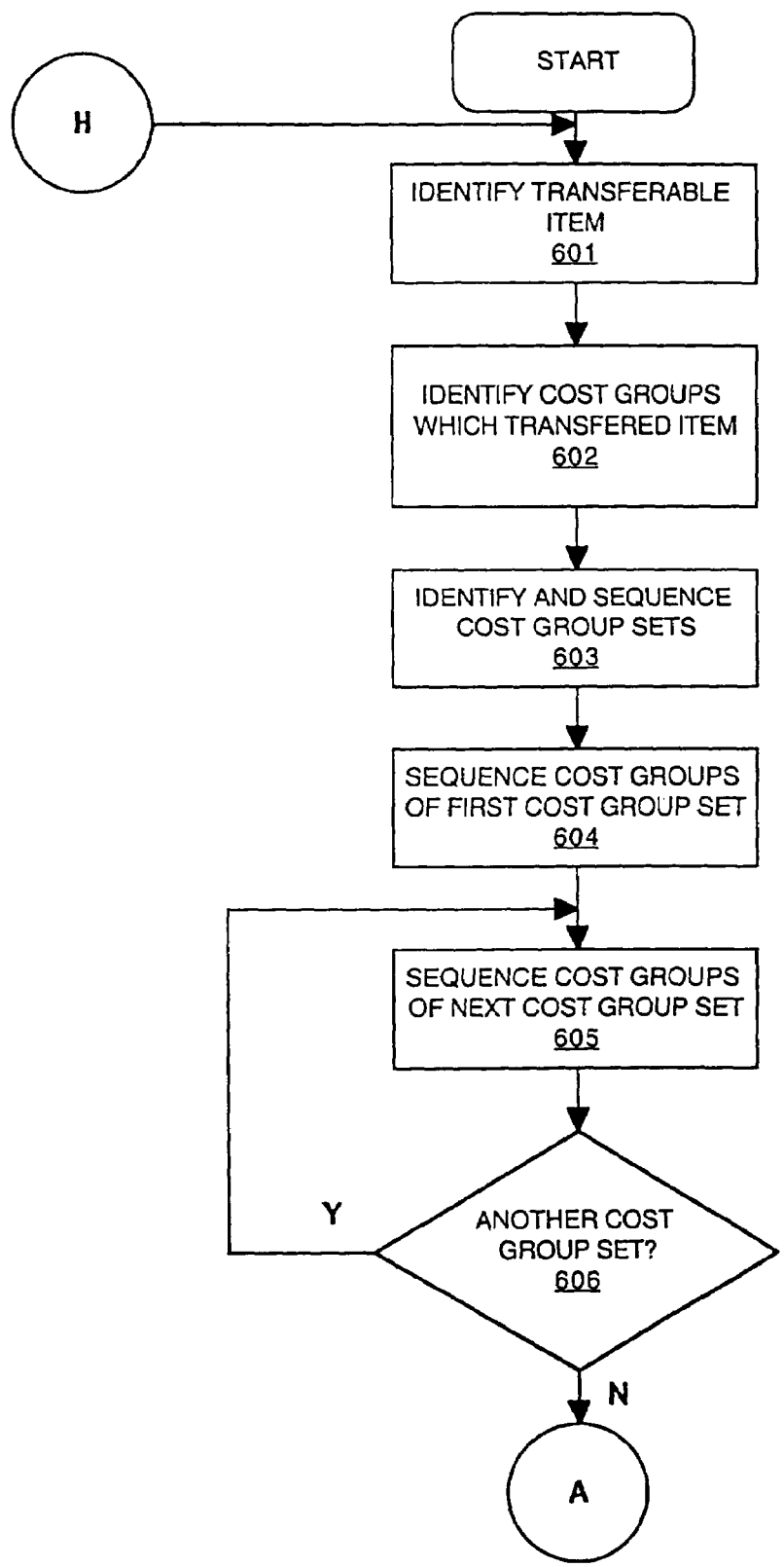
FIGS. 6A, 6B, 6C, 6D, and 6E are a flowchart of a computer implemented method for determining absorption costs for transfers between a plurality of cost groups in accordance with embodiments of the present invention.
Figure 6B:
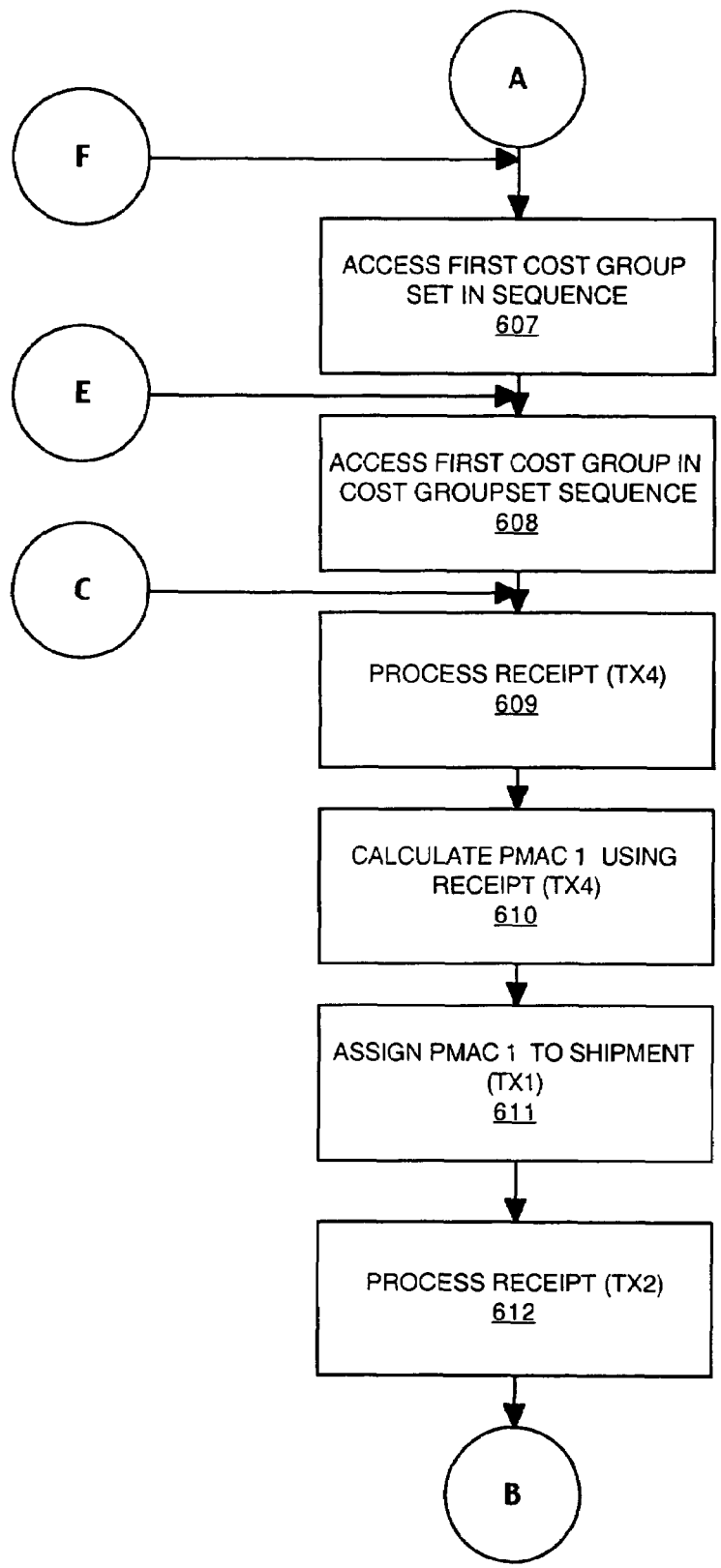
Figure 6C:
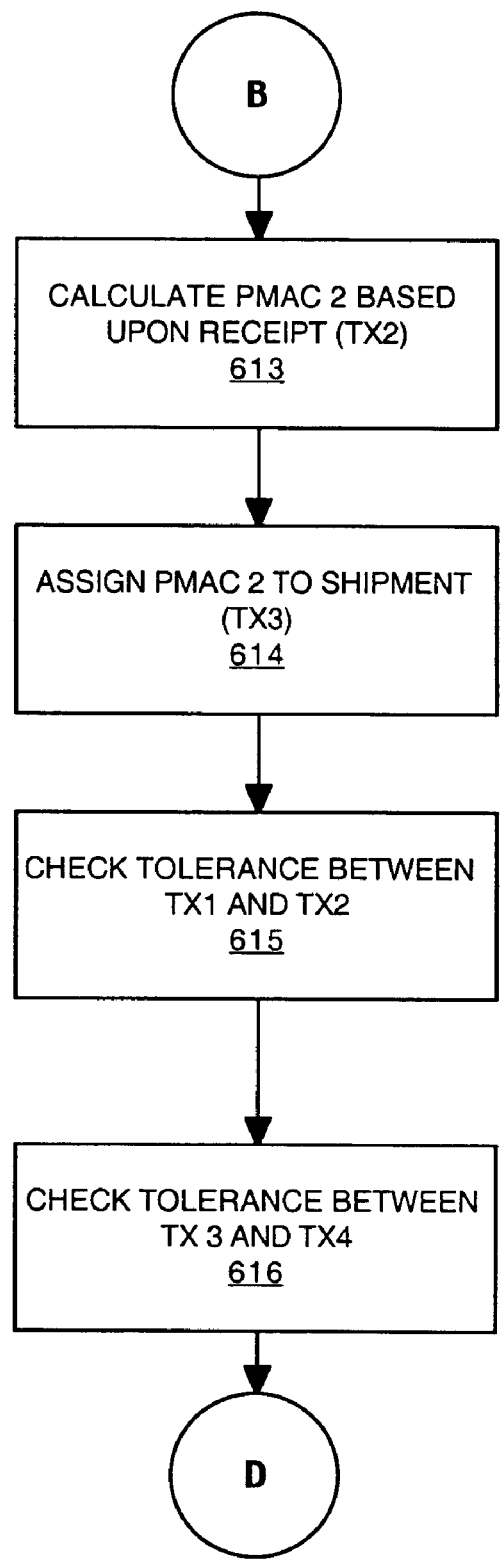
Figure 6D:
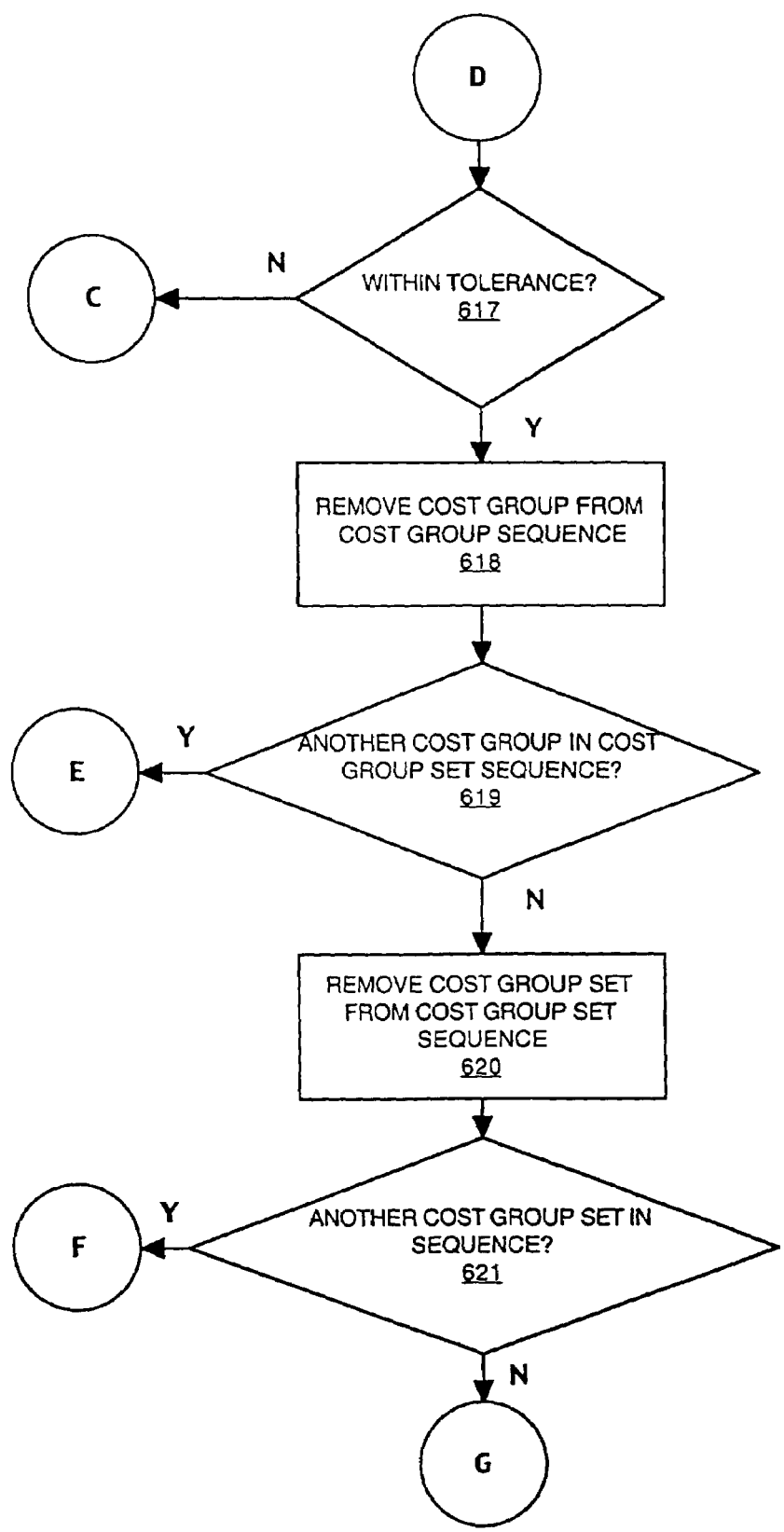
Figure 6E:
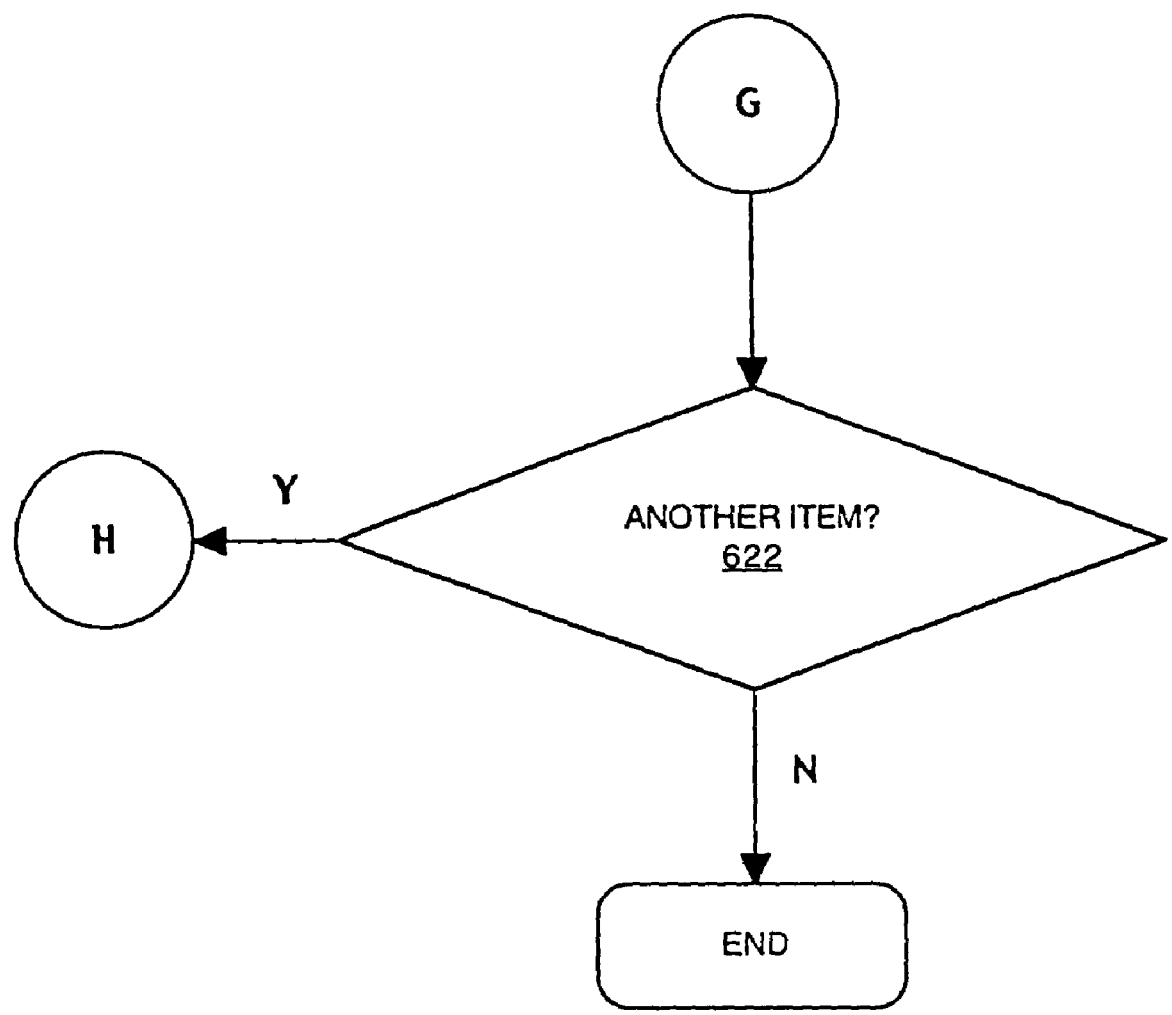

FIG. 5 shows a data diagram of a plurality of cost groups transferring an item in accordance with embodiments of the present invention. In FIG. 5, cost group 2 (402) ships transferable item 510 to cost group 3 (403) in transfer shipment 420 and receives transferable item 510 in transfer shipment 430. For clarity, in the following discussion no freight or other special charges will be applicable to any of the transfers. Additionally, for the purposes of the following discussion, it is assumed that the user has set the tolerance for variation between a shipping transaction cost of a transfer and the corresponding receiving transaction cost to be 0.00000. Furthermore, in the following discussion TX1 refers to the shipping transaction cost for cost group 2 (402) in transaction 420 while TX2 refers to the corresponding receiving transaction cost for cost group 3 (403) in transaction 420. Similarly, TX3 refers to the shipping transaction cost for cost group 3 (403) in transaction 430 while TX4 refers to the corresponding receiving transaction cost for cost group 2 (402) in transaction 430.

The optimal sequence for processing the transactions following the rules discussed above with reference to FIG. 3 and FIG. 4 indicates that the transactions for cost group 2 (402) will be processed before the transactions for cost group 3 (403). The calculation of the periodic average cost for cost groups 2 and 3 may be performed following the Periodic Moving Average Cost (PMAC) method in one embodiment. The PMAC formula is as follows:

$$PMAC = ((\text{Prior Cost} * \text{Prior Quantity}) + (\text{Receipt Quantity} * \text{PMAC cost of corresponding shipment cost})) / (\text{Prior Quantity} + \text{Receipt Quantity})$$

Using the above formula, in the first iteration the processing of transactions is as follows in the below exemplary sequence:

FIRST ITERATION

1.) Cost group 2 periodic cost calculation:
    Process transfer receipt TX4. Transfer receipt TX4 should absorb the cost of TX3 plus any other applicable freight and special charges. Since, in this example, there are none, TX4 takes on the value of TX3, specifically TX4 = $12.00. TX3 as an inter-organization shipment transaction from Cost group 3 has a pmac cost of $12.00
    Calculation of the Periodic Moving Average Cost in Cost group 2.
    PMAC = ((10.00 * 1) + ($12.00 * 1))/(1 + 1) = $11.00
    The PMAC cost is assigned to the corresponding shipment cost. TX1 takes the new PMAC of cost group 2 as the transfer shipment cost. Therefore, TX1 = $11.00.

2.) Cost group 3 periodic cost calculation:
    Process receipt TX2. Transfer receipt TX2 should absorb the cost of TX1 plus any other applicable freight and special charges. Since, in this example, there are none, TX2 takes on the value of TX1, specifically TX2 = $11.00
    Calculation of the Periodic Moving Average Cost in Cost group 3.
    PMAC = (($12.00 * 1) + ($11.00 * 1)/(1 + 1) = $11.50
    The PMAC cost is assigned to the corresponding shipment cost. TX3 takes the new PMAC of cost group 3 as the transfer shipment cost. Therefore, TX3 + $11.50.

3.) Check the tolerance for the first iteration:
    Tolerance between TX2 and TX1 = modulus of [TX2 − TX1] = modulus of [$11.00 − $11.00] = $0.00
    Tolerance between TX4 and TX3 = modulus of [TX4 − TX3] = modulus of [$12.00 − $11.50] = $0.50

Thus, after the first iteration, the tolerance between TX2 and TX1 has been met because the absolute value (e.g., $0.00) of the difference between the shipping transaction cost (TX1) and the corresponding receiving transaction cost (TX2) is less than or equal to the value of the tolerance (e.g., 0.00000). However, the tolerance between TX4 and TX3 has not been met because the absolute value (e.g., $0.50) of the difference between the shipping transaction cost (TX3) and the corresponding receiving transaction cost (TX4) is not less than or equal to the value of the tolerance (e.g., 0.00000).

Therefore, another iteration will be performed to attempt to meet the tolerance for the transactions. The below is an exemplary sequence of the second iteration:

SECOND ITERATION

1.) Cost group 2 periodic cost calculation:
    Process transfer receipt TX4. Transfer receipt TX4 should absorb the cost of TX3 plus any other applicable freight and special charges. Since, in this example, there are none, TX4 takes on the value of TX3, specifically TX4 = $11.50.
    Calculation of the Periodic Moving Average Cost in Cost group 2.
    PMAC = ((10.00 * 1) + ($11.50 * 1))/(1 + 1) = $10.75
    The PMAC cost is assigned to the corresponding shipment cost. TX1 takes the new PMAC of cost group 2 as the transfer shipment cost. Therefore, TX1 = $10.75.

2.) Cost group 3 periodic cost calculation:
    Process receipt TX2. Transfer receipt TX2 should absorb the cost of TX1 plus any other applicable freight and special charges. Since, in this example, there are none, TX2 takes on the value of TX1, specifically TX2 = $10.75
    Calculation of the Periodic Moving Average Cost in Cost group 3.
    PMAC = (($12.00 * 1) + ($10.75 * 1)/(1 + 1) = $11.375
    The PMAC cost is assigned to the corresponding shipment cost. TX3 takes the new PMAC of cost group 3 as the transfer shipment cost. Therefore, TX3 = $11.375.

3.) Check the tolerance for the first iteration:
    Tolerance between TX2 and TX1 = modulus of [TX2 − TX1] = modulus of [$10.75 − $10.75] = $0.00
    Tolerance between TX4 and TX3 = modulus of [TX4 − TX3] = modulus of [$11.50 − $11.375] = $0.125

After the second iteration, the tolerance between TX2 and TX1 has again been met, while the tolerance between TX4 and TX3 has not been met (e.g., $0.125). Therefore, another iteration will be performed to attempt to meet the tolerance for the transactions. For brevity, this discussion will not calculate each iteration that was performed until the tolerance between TX2 and TX1 and the tolerance between TX4 and TX3 were both met. Instead, the following table (e.g., table 1 below) is a summary of each iteration that was performed until both tolerances were met in the 10$^{th}$ iteration. As shown in table 1, not until the 10$^{th}$ iteration do the tolerance between TX2 and TX1 and the tolerance between TX4 and TX3 both meet the tolerance value of 0.00000.

TABLE 1

| ITERATION | COST GROUP 2 | | | COST GROUP 3 | | |
|---|---|---|---|---|---|---|
| Iteration Number | TX4 | Item Cost | TX1 | TX2 | Item Cost | TX3 |
| 1 | 12.00000 | 11.00000 | 11.00000 | 11.00000 | 11.50000 | 11.50000 |
| 2 | 11.50000 | 10.75000 | 10.75000 | 10.75000 | 11.37500 | 11.37500 |
| 3 | 11.37500 | 10.68750 | 10.68750 | 10.68750 | 11.34375 | 11.34375 |
| 4 | 11.34375 | 10.67187 | 10.37187 | 10.67187 | 11.33593 | 11.33593 |
| 5 | 11.33593 | 10.66796 | 10.66796 | 10.66796 | 11.33398 | 11.33398 |
| 6 | 11.33398 | 10.66699 | 10.66699 | 10.66699 | 11.33349 | 11.33349 |
| 7 | 11.33349 | 10.66674 | 10.66674 | 10.66674 | 11.33337 | 11.33337 |
| 8 | 11.33337 | 10.66668 | 10.66668 | 10.66668 | 11.33334 | 11.33334 |
| 9 | 11.33334 | 10.66666 | 10.66666 | 10.66666 | 11.33333 | 11.33333 |
| 10 | 11.33333 | 10.66666 | 10.66666 | 10.66666 | 11.33333 | 11.33333 |

FIGS. 6A, 6B, 6C, 6D, and 6E are a flowchart of a computer implemented method for determining absorption costs for transfers between a plurality of cost groups in accordance with embodiments of the present invention. For greater clarity, FIGS. 6A-6D will be discussed in conjunction with FIG. 5. With reference to step 601, a first transferable item is identified. As discussed above the reference to FIG. 3, iterative process of the present invention can determine the absorption costs of each transferable item transferred between cost groups. The first step is to identify which transferable item is being calculated. In embodiments of the present invention, identifier 201 of system 200 is for identifying a transferable item as in FIG. 2.

Referring now to step 602, cost groups which transferred the transferable item are identified. In embodiments of the present invention, cost groups which transferred the transferable item are identified. This can be performed by, for example, identifier 201 or definer 202 of system 200.

Referring now to step 603, the cost group sets are identified and sequenced. As discussed above with reference to FIG. 3, the cost groups among which the transferable item is transferred are organized into cost group sets. In embodiments of the present invention, the cost groups are organized in three cost group sets. One cost group set comprises cost groups that have generated transfer shipments. Another cost group set comprises cost groups that have generated transfer shipments and transfer receipts. Another cost group set comprises cost groups that have generated transfer receipts. In embodiments of the present invention, definer 202 of system 200 is for defining cost group sets while determiner 203 of system 200 is for determining a sequence of cost group sets.

Referring now to step 604, the cost groups comprising the first cost group set are sequenced. In embodiments of the present invention, the cost groups comprising a cost group set are sequenced in ascending order based upon their inventory of the transferable item at the time just before processing inter-organization transactions. While the present embodiment teaches sequencing in ascending order based upon their inventory of the transferable item, other methods for sequencing the cost groups may be used as well. In embodiments of the present invention, determiner 203 of system 200 is for determining a processing sequence of the cost group sets.

Referring now to step 605, the cost groups comprising the next cost group set are sequenced. After the cost groups comprising the first cost group set are sequenced, the cost groups of the next cost group set are sequenced.

Referring now to step 606, a logical operation is performed to determine if additional cost group sets remain for which the sequencing step 605 should be performed. If additional cost group sets have not yet been sequenced, method 600 returns to step 605, otherwise, method 600 proceeds to step 607.

Referring now to step 607, the first cost group set in the sequence of cost group sets is accessed.

Referring now to step 608, the first cost group in the first cost group set sequence is accessed. As discussed above with reference to FIG. 5, the first cost group in the cost group set is accessed.

Referring now to step 609, the transfer receipt for the presently accessed cost group is processed. As discussed above with reference to FIG. 5, the transfer receipt of the presently accessed cost group (e.g., TX4 of cost group 2) is processed during the cost group 2 periodic cost calculation.

Referring now to step 610, during the cost group 2 periodic cost calculation, the periodic moving average cost is calculated using the transfer receipt. After processing the transfer receipt, the PMAC of that item for that cost group is calculated. For clarity the PMAC for the first cost group being accessed is referred to as "PMAC 1."

Referring now to step 611, the value of the PMAC 1 is assigned to the shipment invoice (e.g., TX1 of FIG. 5). As discussed above with reference to FIG. 5, during the cost group 2 periodic cost calculation, the PMAC of the first cost group (e.g., cost group 2) is assigned to the corresponding shipment cost.

Referring now to step 612, the transfer receipt for the shipment (e.g., TX2 of FIG. 5) is processed. As discussed above with reference to FIG. 5, during the cost group 3 periodic cost calculation, TX2 absorbs the cost of TX1 plus applicable freight and special charges.

Referring now to step 613, a second PMAC is calculated based upon the receipt (e.g., TX2). As discussed above with reference to FIG. 5, during the cost group 3 periodic cost calculation, the PMAC for cost group 3 is calculated based upon the transfer receipt of shipment 420. For clarity the PMAC for the second cost group being accessed is referred to as "PMAC 2."

Referring now to step 614, the value of the PMAC 2 is assigned to the shipment invoice (e.g., TX3 of FIG. 5). As discussed above with reference to FIG. 5, during the cost group 3 periodic cost calculation, the PMAC of the second cost group (e.g., cost group 3) is assigned to the corresponding shipment cost.

Referring now to step 615, a comparison of the values of TX1 and TX2 is performed. Referring again to the discussion of FIG. 5, a tolerance check between TX2 and TX1 is performed. For example, in one embodiment, the value of TX1 is subtracted from the value of TX2.

Referring now to step 616, a comparison of the values of TX3 and TX4 is performed. Referring again to the discussion of FIG. 5, a tolerance check between TX4 and TX3 is performed. For example, in one embodiment, the value of TX3 is subtracted from the value of TX4.

Referring now to step 617, a logical operation is performed to determine if the tolerance between TX1 and TX2 and the tolerance between TX3 and TX4 is within a pre-defined tolerance. If the result of step 614 is within the defined tolerance and the result of step 616 is within the defined tolerance, method 600 proceeds to step 618. If the result of either step 614 or step 616 is not within the defined tolerance, method 600 returns to step 608.

Referring now to step 618, the first cost group is removed from the sequence of its respective cost group set. If the defined tolerance has been met, absorption cost of the transfer between the first cost group (e.g., cost group 2 of FIG. 5) and the second cost group (e.g., cost group 3 of FIG. 5) has been calculated. This does not imply that additional transfers of the same transferable item have not occurred between, for example, the first cost group and a third cost group (not shown). These transfers will be processed at a later time in the cost group sequence.

Referring now to step 619, a logical operation is performed to determine if another cost group follows in the cost group set sequence. If there are no additional cost groups in the cost group set sequence which have transactions applicable to this particular transferable item, method 600 proceeds to step 620. If there are additional cost groups in the cost group sequence which have transactions applicable to this particular transferable item, method 600 proceeds to step 607. Because the first cost group has been removed in step 618, it will not be processed again during this cost group set loop.

Referring now to step 620, the cost group set is removed from the cost group set sequence.

Referring now to step 621, a logical operation is performed to determine if another cost group set remains in the sequence of cost group sets. If there are other cost group sets in the sequence having transactions applicable to this particular transferable item, method 600 returns to step 607 and begins processing the first cost group of that cost group set. Because the first cost group set has been removed in step 620, it will not be processed again during this cost group set loop. If there are no other cost group sets in the sequence having transactions applicable to this particular transferable item, method 600 proceeds to step 622.

Referring now to step 622, a logical operation is performed to determine if another transferable item exists for which the absorption cost can be determined. If there are additional transferable items remaining for which the absorption cost can be determined, method 600 returns to step 601. If there are no additional transferable items remaining for which the absorption cost can be determined method 600 ends.

FIG. 7 is a block diagram of an exemplary computer system upon which embodiments of the present invention may be implemented. With reference to FIG. 7, portions of the present invention are comprised of computer-readable and computer-executable instructions that reside, for example, in computer system 700 which may be used as a part of a general purpose computer network (not shown). It is appreciated that computer system 700 of FIG. 7 is exemplary only and that the present invention can operate within a number of different computer systems including general-purpose computer systems, embedded computer systems, laptop computer systems, hand-held computer systems, and stand-alone computer systems.

In the present embodiment, computer system 700 includes an address/data bus 701 for conveying digital information between the various components, a central processor unit (CPU) 702 for processing the digital information and instructions, a volatile main memory 703 comprised of volatile random access memory (RAM) for storing the digital information and instructions, and a non-volatile read only memory (ROM) 704 for storing information and instructions of a more permanent nature. In addition, computer system 700 may also include a data storage device 705 (e.g., a magnetic, optical, floppy, or tape drive or the like) for storing vast amounts of data. It should be noted that the software program for performing the method for determining absorption costs for transfers between a plurality of cost groups of the present invention can be stored either in volatile memory 703, data storage device 705, or in an external storage device (not shown).

Devices which are optionally coupled to computer system 700 include a display device 706 for displaying information to a computer user, an alpha-numeric input device 707 (e.g., a keyboard), and a cursor control device 708 (e.g., mouse, trackball, light pen, etc.) for inputting data, selections, updates, etc. Computer system 700 can also include a mechanism for emitting an audible signal (not shown).

Furthermore, computer system 700 can include an input/output (I/O) signal unit (e.g., interface) 709 for interfacing with a peripheral device 710 (e.g., a computer network, modem, mass storage device, etc.). Accordingly, computer system 700 may be coupled in a network, such as a client/server environment, whereby a number of clients (e.g., personal computers, workstations, portable computers, mini-computers, terminals, etc.) are used to run processes for performing desired tasks. In particular, computer system 700 can be coupled in a method for determining absorption costs for transfers between a plurality of cost groups.

The preferred embodiment of the present invention, a method and system for determining absorption costs for transfers between a plurality of cost groups, is thus described. While the present invention has been described in particular embodiments, it should be appreciated that the present invention should not be construed as limited by such embodiments, but rather construed according to the following claims.

What is claimed is:

1. A method for determining absorption costs for transfers between a plurality of cost groups, said method comprising:
   identifying, at a computer system, a transferable item;
   defining, at the computer system, a plurality of cost group sets among which said transferable item is transferred;
   determining, at the computer system, a processing sequence of said plurality of cost group sets;
   determining, at the computer system, a processing sequence of said plurality of cost groups in each cost group set based on the number of cost groups in each cost group set and an inventory of the transferable item in each cost group; and
   performing, at the computer system, an iterative process for determining the cost of transfers between said plurality of cost groups based upon said processing sequence of said plurality of cost groups and said processing sequence of said plurality of said cost group sets until the costs of transfers between said plurality of cost groups is less than or equal to a pre-defined value.

2. The method as recited in claim 1 wherein said iterative processes comprises:
   updating a transfer receipt cost calculation and a transfer shipment cost calculation such that the difference between the transfer receipt cost calculation and the transfer shipment cost calculation is reduced, said updating comprising:
      determining a transfer receipt cost calculation by processing a transfer receipt of said transferable item as a cost owned transaction;
      determining a transfer shipment cost calculation by processing a transfer shipment of said transferable item as a cost derived transaction; and
      comparing the difference between said transfer shipment cost calculation and said transfer receipt cost calculation with the pre-defined value.

3. The method as recited in claim 1 wherein said defining said plurality of cost group sets further comprises:
   creating a first cost group set comprising cost groups which have generated transfer shipments;
   creating a second cost group set comprising cost groups which have generated transfer shipments and transfer receipts; and
   creating a third cost group set comprising cost groups which have generated transfer receipts.

4. The method as recited in claim 3 wherein said determining a processing sequence of said plurality of cost group sets comprises:
   processing said first cost group set;
   processing said second cost group set after processing said first cost group set; and
   processing said third cost group set after processing said second cost group set.

5. The method as recited in claim 4 wherein said determining a processing sequence said plurality of cost group sets further comprises:
   establishing an ascending ranking in each of said cost group sets wherein each cost group in a given cost group set is ranked based upon the inventory of said transferable item.

6. The method as recited in claim 1 wherein said performing said iterative process comprises:
   determining a first periodic moving average cost of said transferable item for said first of said plurality of cost groups based upon a first transaction receipt cost and designating said first periodic moving average cost as a first transaction shipment cost for said first of said plurality of cost groups;
   using said first transaction shipment cost as a second transaction receipt cost for said second of said plurality of cost groups to determine a second periodic moving average cost of said transferable item for said second of said plurality of cost groups based upon said transaction receipt cost;
   using said second periodic moving average cost as a second transaction shipment cost for said second of said plurality of cost groups;
   comparing a first tolerance and a second tolerance, wherein said first tolerance comprises the difference between said first transaction shipment cost and said second transaction receipt cost and wherein said second tolerance comprises the difference between said second transaction shipment cost and said first transaction receipt cost and wherein said pre-defined value comprises at least one or the first tolerance and the second tolerance.

7. The method as recited in claim 4, further comprising determining absorption costs for second cost group set.

8. A computer usable medium having computer readable program code embodied therein for causing a computer system to perform a method for determining absorption costs for transfers between a plurality of cost groups, said method comprising:
   identifying a transferable item;
   defining a plurality of cost group sets among which said transferable item is transferred;
   determining a processing sequence of said plurality of cost group sets;
   determining a processing sequence of said plurality of cost groups in each cost group set based on the number of cost groups in each cost group set and an inventory of the transferable item in each cost group; and
   performing an iterative process for determining the cost of transfers between said plurality of cost groups based upon said processing sequence of said plurality of cost groups and said processing sequence of said plurality of said cost group sets until the costs of transfers between said plurality of cost groups is less than or equal to a pre-defined value.

9. The computer usable medium of claim 8 wherein said iterative process comprises:
   updating a transfer receipt cost calculation and a transfer shipment cost calculation such that the difference between the transfer receipt cost calculation and the transfer shipment cost calculation is reduced, said updating comprising:
      determining a transfer receipt cost calculation by processing a transfer receipt of said transferable item as a cost owned transaction;
      determining a transfer shipment cost calculation by processing a transfer shipment of said transferable item as a cost derived transaction; and
      comparing the difference between said transfer shipment cost calculation and said transfer receipt cost calculation with the pre-defined value.

10. The computer usable medium of claim 8 wherein said defining said plurality of cost group sets further comprises:
    creating a first cost group set comprising cost groups which have generated transfer shipments;
    creating a second cost group set comprising cost groups which have generated transfer shipments and transfer receipts; and
    creating a third cost group set comprising cost groups which have generated transfer receipts.

11. The computer usable medium of claim 10 wherein said determining a processing sequence of said plurality of cost group sets comprises:
    processing said first cost group set;
    processing said second cost group set after processing said first cost group set; and
    processing said third cost group set after processing said second cost group set.

12. The computer usable medium of claim 11 wherein said determining a processing sequence of said plurality of cost group sets further comprises:
    establishing an ascending ranking in each of said cost group sets wherein each cost group in a given cost group set is ranked based upon the inventory of said transferable item.

13. The computer usable medium of claim 9 wherein said performing said iterative process comprises:
    determining a first periodic moving average cost of said transferable item for said first of said plurality of cost groups based upon a first transaction receipt cost and designating said first periodic moving average cost as a first transaction shipment cost for said first of said plurality of cost groups;
    using said first transaction shipment cost as a second transaction receipt cost for said second of said plurality of cost groups to determine a second periodic moving average cost of said transferable item for said second of said plurality of cost groups based upon said transaction receipt cost;
    using said second periodic moving average cost as a second transaction shipment cost for said second of said plurality of cost groups;
    comparing a first tolerance and a second tolerance, wherein said first tolerance comprises the difference between said first transaction shipment cost and said second transaction receipt cost and wherein said second tolerance comprises the difference between said second transaction shipment cost and said first transaction receipt cost and wherein the pre-defined value comprises at least one of the first tolerance and the second tolerance.

14. The computer usable medium of claim 12, further comprising determining absorption costs for said second cost group set.

15. A computer implemented system for determining absorption costs for transfers between a plurality of cost groups, said system comprising:
    an identifier for identifying a transferable item;
    a definer coupled with said identifier, said definer for defining a plurality of cost group sets among which said transferable item is transferred;
    a determiner coupled with said identifier and with said definer, said determiner for determining a processing sequence of said plurality of cost group sets and a processing sequence of said plurality of cost groups in each cost group set based on the number of cost groups in each cost group set and an inventory of the transferable item in each cost group; and a processor coupled with said identifier, said definer, and said determiner, said processor for performing an iterative process for determining the cost of transfers between said plurality of cost groups based upon said processing sequence of said plurality of cost groups and said processing sequence of said plurality of said cost group sets until the costs of transfers between said plurality of cost groups is less than or equal to a pre-defined value.

16. The system of claim 15 wherein said iterative process comprises:
    updating a transfer receipt cost calculation and a transfer shipment cost calculation such that the difference between the transfer receipt cost calculation and the transfer shipment cost calculation is reduced, said updating comprising:
        determining a transfer receipt cost calculation by processing a transfer receipt of said transferable item as a cost owned transaction;
        determining a transfer shipment cost calculation by processing a transfer shipment of said transferable item as a cost derived transaction; and
    comparing the difference between said transfer shipment cost calculation and said transfer receipt cost calculation with pre-defined value.

17. The system of claim 15 wherein said definer defines said plurality of cost group sets by:
    creating a first cost group set comprising cost groups which have generated transfer shipments;
    creating a second cost group set comprising cost groups which have generated transfer shipments and transfer receipts; and
    creating a third cost group set comprising cost groups which have generated transfer receipts.

18. The system of claim 17 wherein said determiner determines a processing sequence of said plurality of cost group sets by:
    processing said first cost group set;
    processing said second cost group set after processing said first cost group set; and
    processing said third cost group set after processing said second cost group set.

19. The system of claim 18 wherein said determiner further determines a processing sequence of said plurality of cost group sets by:
    establishing an ascending ranking in each of said cost group sets wherein each cost group in a given cost group set is ranked based upon the inventory of said transferable item.

20. The system of claim 19 wherein said processor performs said iterative process by:
    determining a first periodic moving average cost of said transferable item for said first of said plurality of cost groups based upon a first transaction receipt cost and designating said first periodic moving average cost as a first transaction shipment cost for said first of said plurality of cost groups;
    using said first transaction shipment cost as a second transaction receipt cost for said second of said plurality of cost groups to determine a second periodic moving average cost of said transferable item for said second of said plurality of cost groups based upon said transaction receipt cost;
    using said second periodic moving average cost as a second transaction shipment cost for said second of said plurality of cost groups;
    comparing a first tolerance and a second tolerance, wherein said first tolerance comprises the difference between said first transaction shipment cost and said second transaction receipt cost and wherein said second tolerance comprises the difference between said second transaction shipment cost and said first transaction receipt cost and wherein the pre-defined value comprises at least one of the first tolerance and the second tolerance.

21. The system of claim 20 wherein said processor utilizes said iterative process to determine absorption costs for second cost group set.

* * * * *

UNITED STATES PATENT AND TRADEMARK OFFICE
CERTIFICATE OF CORRECTION

| | | |
|---|---|---|
| PATENT NO. | : 7,729,958 B2 | |
| APPLICATION NO. | : 11/019346 | |
| DATED | : June 1, 2010 | |
| INVENTOR(S) | : Veeresha Javli et al. | |

It is certified that error appears in the above-identified patent and that said Letters Patent is hereby corrected as shown below:

In column 7, line 20, after "iteration" insert -- ; --.

In column 7, line 41, after "LOOP" insert -- ; --.

In column 11, line 7, delete "the" and insert -- with --, therefor.

In column 14, line 29, in claim 2, delete "processes" and insert -- process --, therefor.

In column 17, line 25, in claim 16, after "with" insert -- the --.

Signed and Sealed this
Second Day of August, 2011

David J. Kappos
*Director of the United States Patent and Trademark Office*